(12) United States Patent
Eppler

(10) Patent No.: US 11,056,134 B1
(45) Date of Patent: Jul. 6, 2021

(54) CAPACITIVELY OPERATED MICROWAVE ASSISTED MAGNETIC RECORDING OSCILLATOR

(71) Applicant: Seagate Technology LLC, Cupertino, CA (US)

(72) Inventor: Walter R. Eppler, Cranberry Township, PA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/722,886

(22) Filed: Dec. 20, 2019

(51) Int. Cl.
*G11B 5/31* (2006.01)
*G11B 5/127* (2006.01)
*G11B 11/08* (2006.01)
*G11B 5/60* (2006.01)
*G11B 5/00* (2006.01)

(52) U.S. Cl.
CPC ............ *G11B 5/314* (2013.01); *G11B 5/1278* (2013.01); *G11B 5/315* (2013.01); *G11B 5/6082* (2013.01); *G11B 11/08* (2013.01); *G11B 2005/0024* (2013.01)

(58) Field of Classification Search
None
See application file for complete search history.

(56) References Cited

U.S. PATENT DOCUMENTS

| 7,336,590 | B2 | 2/2008 | Cho et al. | |
|---|---|---|---|---|
| 7,881,175 | B2 | 2/2011 | Maeda | |
| 8,837,070 | B1* | 9/2014 | Johnson et al. | G11B 5/6017 360/55 |
| 9,747,932 | B1 | 8/2017 | Taguchi et al. | |
| 2005/0280935 | A1* | 12/2005 | Clinton et al. | G11B 5/315 360/125.32 |
| 2007/0297081 | A1* | 12/2007 | Nazarov et al. | G11B 5/127 360/59 |
| 2008/0316631 | A1* | 12/2008 | Gao et al. | G11B 5/3133 360/55 |
| 2009/0109570 | A1* | 4/2009 | Scholz et al. | G11B 5/1278 360/129 |
| 2009/0262636 | A1* | 10/2009 | Xue et al. | G11B 5/314 369/126 |
| 2009/0310244 | A1 | 12/2009 | Shimazawa et al. | |

(Continued)

OTHER PUBLICATIONS

Zhang, Mingsheng et al., Research Article, "Analysis of Switchable Spin Torque Oscillator for Microwave Assisted Magnetic Recording", Hindawi Publishing Corporation, Advances in Condensed Matter Physics, vol. 2015, Article ID 457456, 6 pages, http://dx.doi.org/10.1155/2015/457456, 7 pages, Mar. 10, 2015.

*Primary Examiner* — Craig A. Renner
(74) *Attorney, Agent, or Firm* — Westman, Champlin & Koehler, P.A.

(57) ABSTRACT

An apparatus includes a write pole that stores data on tracks on a data storage medium. The apparatus also includes side shields on first and second sides of the write pole, and a trailing shield above the write pole and above the side shields. The apparatus further includes a microwave assisted magnetic recording oscillator having conductive pads that form capacitors with portions of a conductive film of the data storage medium. The conductive pads are positioned on a medium-facing surface of a slider that includes the write pole, the side shields and the trailing shield.

20 Claims, 7 Drawing Sheets

(56) References Cited

U.S. PATENT DOCUMENTS

| | | | |
|---|---|---|---|
| 2010/0309577 A1* | 12/2010 | Gao et al. | G11B 5/314 360/235.4 |
| 2011/0090584 A1* | 4/2011 | Franca-Neto et al. | G11B 5/314 360/55 |
| 2011/0090596 A1* | 4/2011 | Franca-Neto et al. | G11B 5/315 360/125.03 |
| 2012/0230167 A1* | 9/2012 | Aoyama et al. | G11B 5/314 369/13.01 |
| 2012/0301746 A1* | 11/2012 | Franca-Neto et al. | G11B 5/1278 428/810 |
| 2016/0314809 A1 | 10/2016 | Taguchi et al. | |

\* cited by examiner

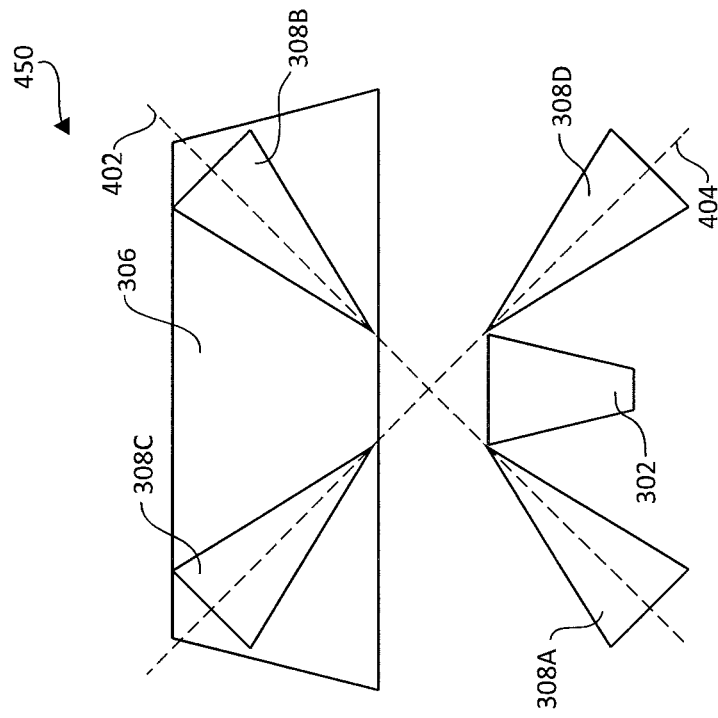
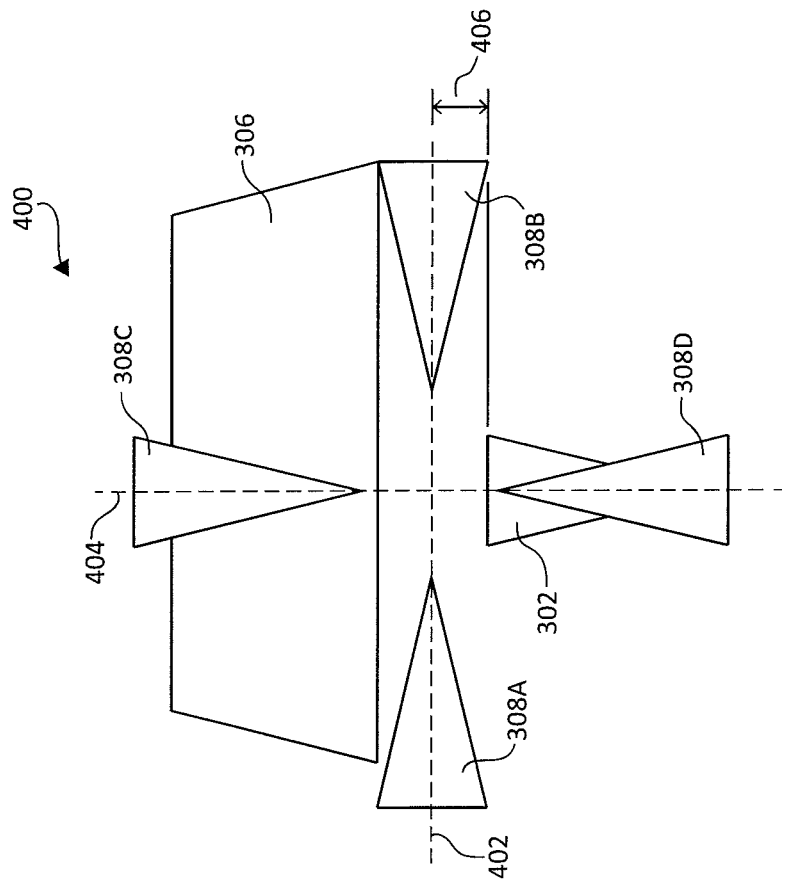
FIG. 4B
FIG. 4A

CAPACITIVELY OPERATED MICROWAVE ASSISTED MAGNETIC RECORDING OSCILLATOR

SUMMARY

In one embodiment, an apparatus includes a write pole that stores data on tracks on a data storage medium. The apparatus also includes side shields on first and second sides of the write pole, and a trailing shield above the write pole and above the side shields. The apparatus further includes a microwave assisted magnetic recording oscillator having conductive pads that form capacitors with portions of a conductive film of the data storage medium. The conductive pads are positioned on a medium-facing surface of a slider that includes the write pole, the side shields and the trailing shield.

In another embodiment, a data storage device includes a write pole that stores data on tracks on a data storage medium. The data storage device also includes side shields on first and second sides of the write pole, and a trailing shield above the write pole and above the side shields. The data storage device further includes a non-spin-torque microwave assisted magnetic recording oscillator.

In yet another embodiment, a method is provided. The method includes forming a write pole over a substrate that is a portion of a slider. The write pole is capable of storing data on tracks on a data storage medium. The method also includes forming side shields on first and second sides of the write pole, and forming a trailing shield above the write pole and above the side shields. The method further includes forming conductive pads on a medium-facing surface of the slider. The conductive pads are formed as a part of a microwave assisted magnetic recording oscillator.

This summary is not intended to describe each disclosed embodiment or every implementation of elements of the microwave assisted magnetic recording oscillator. Many other novel advantages, features, and relationships will become apparent as this description proceeds. The figures and the description that follow more particularly exemplify illustrative embodiments.

BRIEF DESCRIPTION OF THE DRAWINGS

FIGS. 4A and 4B are air-bearing surface views of portions of sliders that include conductive pads in accordance with other embodiments.

DETAILED DESCRIPTION OF ILLUSTRATIVE EMBODIMENTS

Embodiments of the disclosure relate to microwave assisted magnetic recording (MAMR) oscillators for use in data storage devices. Example data storage devices in which MAMR oscillators may be employed include hard disk drives (HDDs), which are electromechanical devices containing spinning data storage disks and movable read/write heads, and hybrid drives which include features of HDDs and also include electronic memory chips (e.g. one or more solid-state Flash memory chips). Prior to providing additional details regarding the different embodiments, a description of an illustrative operating environment is provided below.

Figure 1:
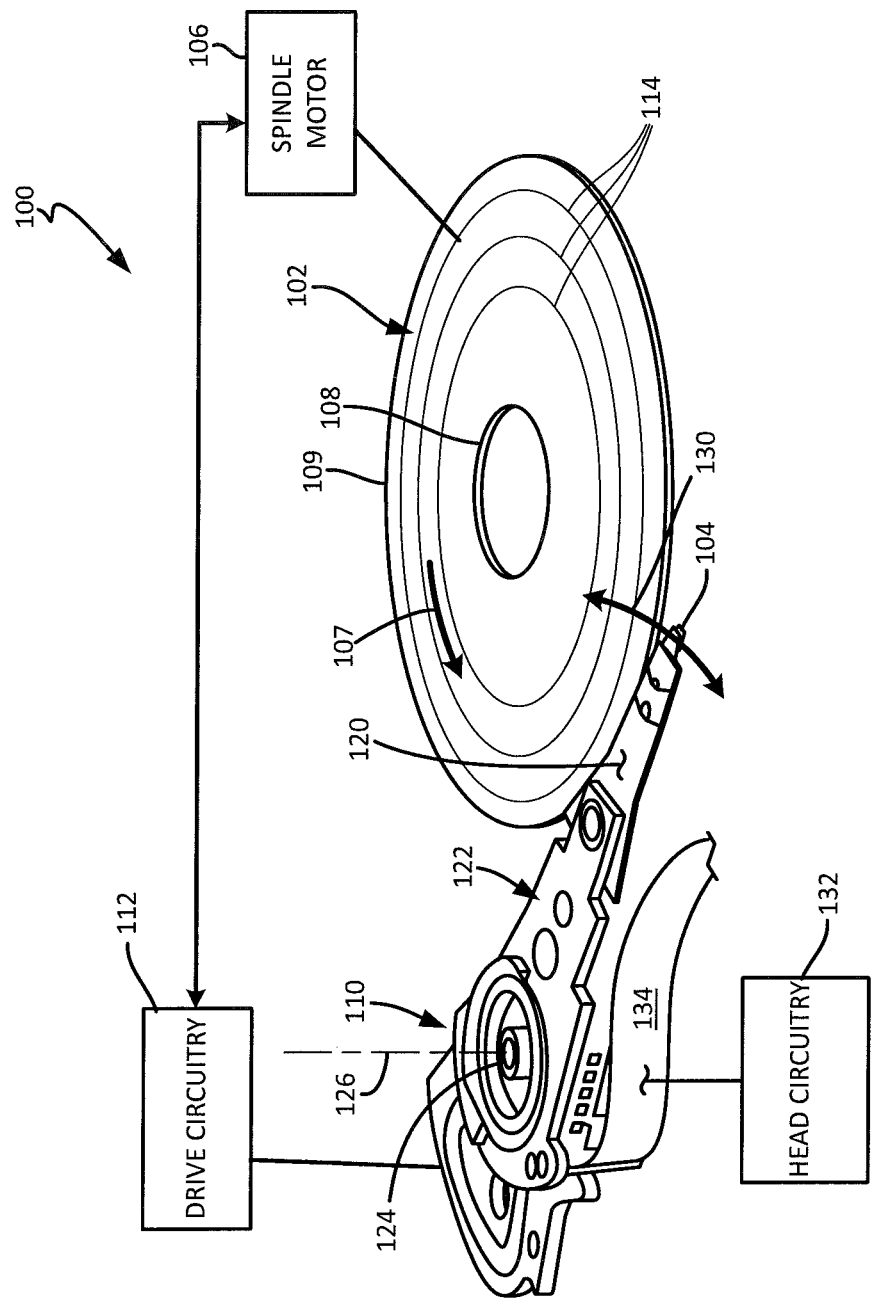
FIG. 1 illustrates an embodiment of a data storage device in which embodiments of the present application can be used.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device 100 including a data storage medium and a head for reading data from and/or writing data to the data storage medium. In data storage device 100, head 104 is positioned above storage medium 102 to read data from and/or write data to the data storage medium 102. In the embodiment shown, the data storage medium 102 is a rotatable disk or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks 114 on the rotating medium 102 between an inner diameter 108 and an outer diameter 109. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection. Also, head 102 is electrically coupled to head circuity 132 through flex circuit 134. Although FIG. 1 illustrates a single load beam coupled to the actuator mechanism 110, additional load beams 120 and heads 104 can be coupled to the actuator mechanism 110 to read data from or write data to multiple disks of a disk stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 2:
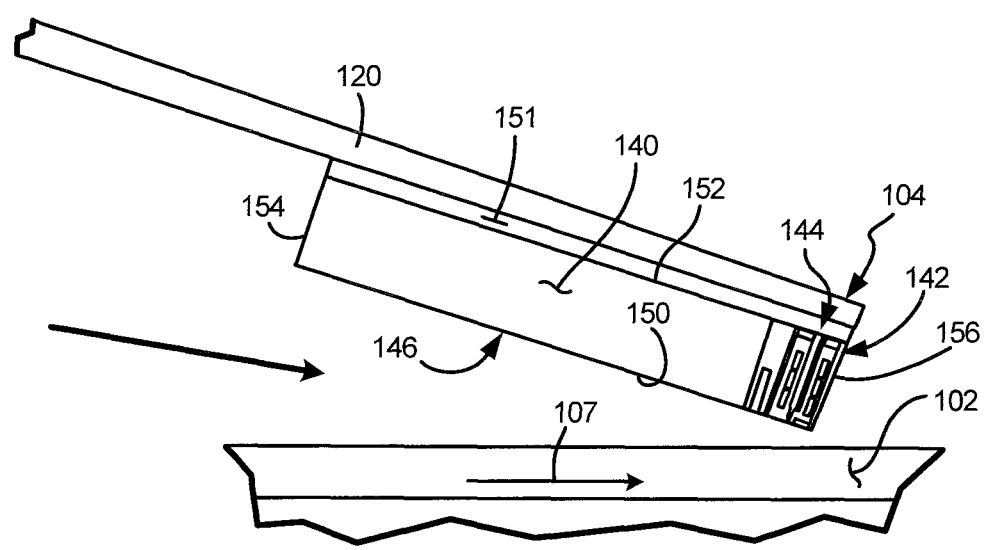
FIG. 2 is a schematic illustration of a recording head including one or more transducer elements.

FIG. 2 is a detailed illustration (side view) of the head 104 above the medium 102. The transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disk 102 creates an air flow in rotation direction 107 as shown in FIG. 2 along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations.

Data storage devices (e.g., HDDs) such as 100 of FIG. 1 provide an effective solution to the ever increasing demand for data storage. Expanding capacities even further may entail that the write element size (e.g., write portion of head 104 of FIGS. 1 and 2) be reduced, as well as the size of the magnetic grains that store bit information. Each grain within the media (e.g., disk) 102 of FIGS. 1 and 2 is a magnet that is aligned in either an up or down direction (e.g., pointing out of the disk 102 surface or into the disk 102 surface) to perform a write operation, and is helped by a magnetic field invoked from the write element in head 104. The write element in head 104 is sometimes referred to herein as a write head. A challenge is whether enough magnetic field can be generated by the smaller write head in order to flip the magnets (e.g., magnetize the media according to the data pattern to be written) in one direction, overcoming the energy barrier. If the storage medium is made with low coercivity, a lower energy barrier flips the magnets, however, the media grains become susceptible to thermal instability and the magnets can flip inadvertently, losing integrity of data. Therefore, increasing disk capacity is possible by employing a storage medium that has a high enough energy barrier to overcome thermal instability, as well as a write head that provides an assist to lower the energy barrier while writing to disk. There are two magnetic recording technologies that provide an energy-assist, either heat-assisted or microwave-assisted.

Heat-Assisted Magnetic Recording (HAMR) technology is based on positioning a laser diode directly in front of the write head assembly, and very rapidly heating the high coercivity medium that cannot be written to unless it is heated during the writing process. As the medium cools down from the intense laser heat, the coercivity of the medium increases, holding the bits in state, and making it difficult for the magnetization to inadvertently change.

Microwave-assisted magnetic recording (MAMR) utilizes a microwave field to provide the energy-assist. The magnetic grains on disk are similar to spinning gyroscopes that are stable in either an up or down direction in the absence of an external field. When a sufficient magnetic field is applied in the opposite direction of the current state of the magnets, the polarity flips in the direction of the applied field. MAMR systems lower the switching field by applying an oscillating field at approximately the gyromagnetic processional frequency of the magnetic storage media. This microwave field source, if orientated in the plane of recording media, applies torque to the magnetization orientated out of the plane disk initiating switching at lower fields. A challenge in MAMR is to collocate the microwave field source with the field from the poles of a standard write head. Currently, a common solution is to place a spin torque oscillator (STO) between the poles of the write head. This however, limits the designer's ability to shrink the gap between write poles, limiting the gradient and hence the resolution of the MAMR write head. Embodiments of the disclosure described below address this issue.

Due to the fact that the top layer of current magnetic recording media is a conductor having about ⅙ the conductivity of copper, by appropriately patterning metal features on an air bearing surface or media-facing surface, an inductance-capacitance (LC) oscillator can be built that is capable of generating linearly or circularly oscillating current in the top layer of the disk, which by Ampere's law creates linearly or circularly oscillating magnetic fields in the storage media. This LC structure may be aligned to the poles of the magnetic recording heads but being on the air-bearing surface no longer restricts the size of the gap between the write poles. Furthermore, assuming the leads to this structure are good conductors, heat generating losses will be in the top surface of the media rather than in the recording head giving an additional heat assist to the recording head.

Figure 3A:
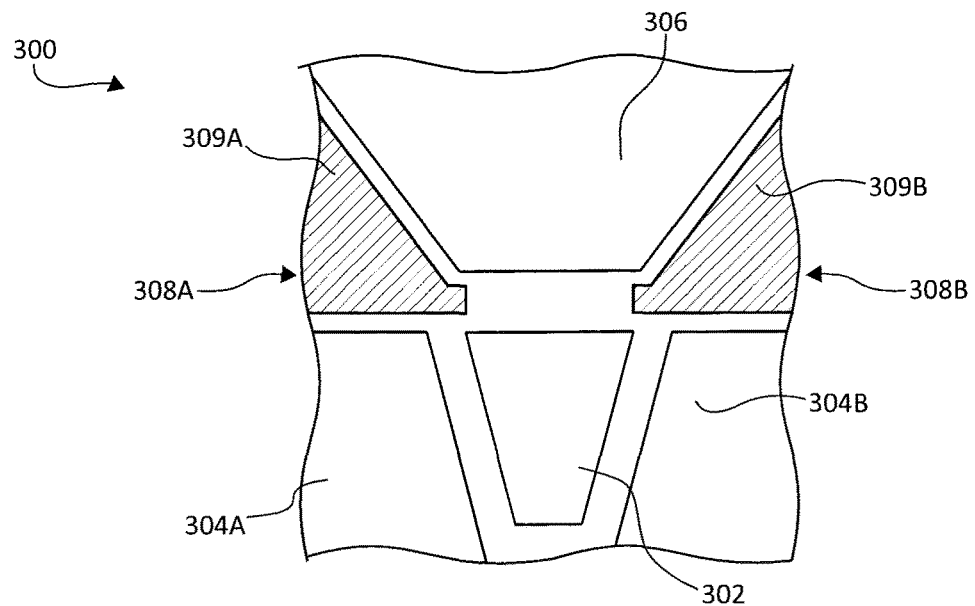
FIG. 3A is an air-bearing surface view of a portion of a slider that includes conductive pads at a trailing edge of a write pole in the slider in accordance with one embodiment.
Figure 3B:
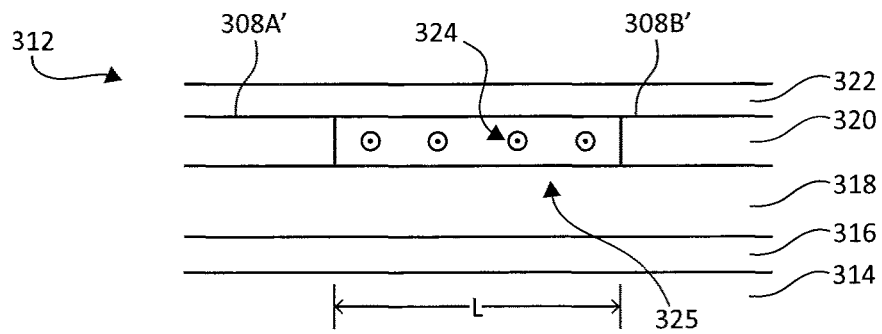
FIGS. 3B and 3C illustrate side and top views, respectively, of a data storage medium portion showing current that flows across a track during a write operation.
Figure 3C:
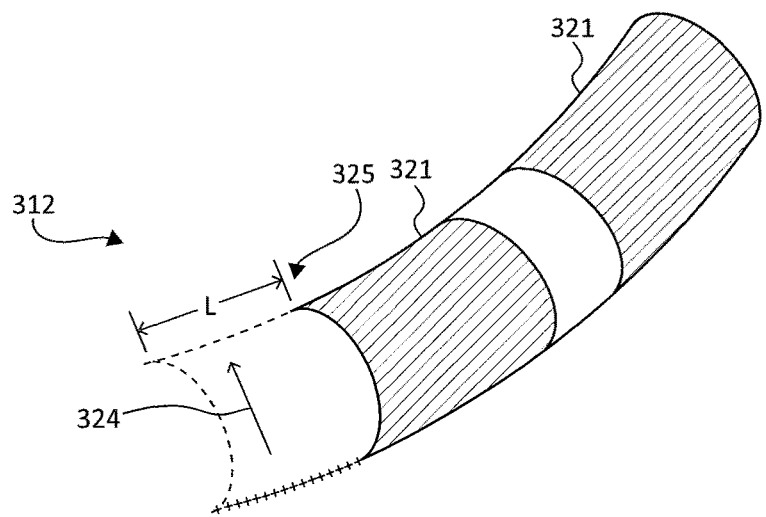

FIG. 3A depicts an air-bearing surface view of a portion of a slider 300 that includes conductive pads at a trailing edge of a write pole in the slider 300 in accordance with one embodiment. FIGS. 3B and 3C illustrate side and top views, respectively, of a data storage medium portion 312 showing current that flows across a track during a write operation.

Slider portion 300 of FIG. 3A is a write head portion of the slider and includes a write pole 302, side shields 304A and 304B and a front shield or trailing shield 306. Data storage medium portion (e.g., disk portion) 312 of FIG. 3B includes a soft under layer (SUL) 314, a seed layer 316, a magnetic layer (e.g., a CoCrPt layer) 318, a coupled granular/continuous (CGC) layer 320 and an overcoat layer (e.g., a diamond-like carbon (DLC) and lube layer) 322. Write head 300 interacts with data storage medium portion 312 to magnetize grains in the magnetic layer 318.

In embodiments of the disclosure, an inductance-capacitance (LC) oscillator is formed by including at least two conductive pads (e.g., 308A and 308B) at the bearing surface of slider 300. Each of the conductive pads 308A, 308B may be protected by a mechanically hard insulating material (denoted by 309A and 309B in FIG. 3A) to prevent wear and electrical discharge to the disk portion 312 whose conductive layer (e.g., portions 308A' and 308B' of CGC layer 320) forms capacitors with conductive pads 308A and 308B. In one form, which generates a linearly oscillating magnetic field, oriented either across track (pads forming capacitors spaced down-track) or down track (pads 308A and 308B forming capacitors spaced across track as shown in FIG. 3A), inductors (not shown in FIG. 3A) are connected in series with a resistance-capacitance (RC) network formed by the conductive pads 308A and 308B and the conductive layer (e.g., CGC layer 320) of the disk portion 312. This inductive connection does not have to be on the air bearing surface and could be fabricated in the same processes that form the write poles or could even be the residual inductance of the leads to each capacitor. During operation, a current 324 is induced in portion 325 (having length L) of CGC layer 320. The current 324 is in a cross-track direction as shown in FIG. 3C, which shows a track portion with previously written bits 321 and portion 325. It should be noted that, although conductive pads 308A and 308B are disposed in a cross-track direction in FIG. 3B, pads 308A and 308B may be positioned in any suitable manner on the bearing surface of slider 300. Thus, in an alternative embodiment, pads 308A and 308B may be disposed in a down-track direction (e.g., arranged in a manner similar to conductive pads 308C and 308D in FIG. 4A, which is described further below). In such an embodiment, induced current 324 will be in a down-track direction.

Figure 3D:
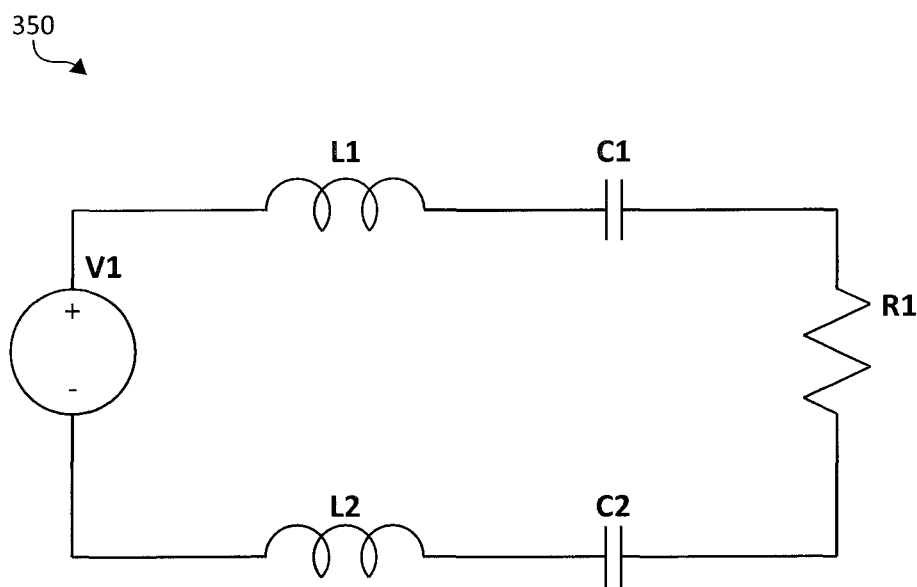
FIG. 3D is a circuit representation of a microwave assisted magnetic recording (MAMR) oscillator formed by elements of FIGS. 3A and 3B.

FIG. 3D is a circuit representation 350 of a microwave assisted magnetic recording (MAMR) oscillator formed by elements of FIGS. 3A and 3B. Circuit 350 includes capacitors C1 and C2 formed by conductive pads 308A and 308B (of FIG. 3A) and conductive film portions 308A' and 308B' (of FIG. 3B) in CGC layer 320 of disk portion 312. R1 represents a resistance of CGC layer portion 325, which extends from the region 308A' under pad 308A to the region 308B' under pad 308B. L1 and L2 are the self-inductance of connectors from oscillating voltage source V1 to pads 308A and 308B or inductors purposely integrated into these connections. Oscillating voltage source V1, which oscillates within a microwave frequency range (e.g., about 300 megahertz to about 300 gigahertz), may include gates of a digital circuit configured to self-oscillate. The voltage source V1 circuitry may be included on slider 300 (of FIG. 3A) or within slider 300.

To estimate the possible magnitude of induced current 324 of FIGS. 3B and 3C the capacitance between either pad 308A or pad 308B and the disk portion 312 is approximated as a parallel plate capacitor. The capacitance of a parallel plate capacitor is $$C = \frac{k\varepsilon_0 A}{d} \quad \text{Equation 1}$$

where A is the area of the conductive pad 308A, 308B, d the spacing between the pads and the first conductive layer (e.g., CGC layer 320) in the disk portion 312 and k is the effective dielectric constant of the materials between the two conductors (e.g., 308A and 308A' or 308B and 30B') including the air gap. A diamond like carbon film, which, in some embodiments, may be the overcoat on both the disk portion 312 and the conductive pads 308A, 308B, has a dielectric constant between 2.7 and 6 and a portion of the dielectric is pressurized air (somewhat larger than 1). Depending on exact thicknesses, the effective dielectric constant will vary. In one example, an effective dielectric constant is 2.5 (partially filled with a DLC film with dielectric constant of 4). Using a total spacing of 4 nm (1 nm clearance and 1.5 nm overcoat on either surface) a surface area 40 m² (assumed triangular shaped pad with base of 5 μm and height 16 μm, where the capacitance scales with the area) the capacitance would be 0.2 pF.

Assuming most of the current 324 flows in CGC layer 320 of the disk portion 312, the resistance of CGC layer portion 325 will be $$R = \frac{d}{\sigma t w} \quad \text{Equation 2}$$

where d is the distance between the closest points of each capacitor, t the thickness of the CGC layer, σ the conductivity of the CGC layer and w the down track width over which the current 324 flows largely defined by the width of the closest edges of each capacitor. Assuming d and w to be approximately the same, the conductivity of the CGC layer 320 to be one sixth that of copper and its thickness to be 2 nm, the resistance should be approximately 50Ω.

The inductance of the leads to the capacitor plates may now be designed such that the resonant frequency of the series LRC circuit is approximately the gyromagnetic processional frequency of the magnetization in the storage layer (e.g., magnetic layer 318). Given the properties of current storage layers this should be in the range of 20 GHz-80 Ghz. To estimate the size of the field available an inductance of 0.2 nH is used, which places the resonant frequency of the LRC circuit at $\omega_0 = 1/\sqrt{LC}$, or 25 Ghz. At the resonant frequency of the inductor and capacitor the current will be V/R or with 0.5 Volts applied the current will be 10 mA. Using Ampere's circuital law and neglecting the thickness t since it is much smaller than w, a magnetic field just outside the region 325 of the CGC layer in which the current 324 flows will be $$H = \frac{I}{2w} \quad \text{Equation 3}$$

or substituting V/R for the current, $$H = \frac{\sigma V t}{2d} \quad \text{Equation 4}$$

or 200 kA/m or 2513 Oersted for track width d of 25 nm. Assuming the down-track width w over which the current flows is approximately the same as the track width d, the current density in the top layer of the disk is two orders of magnitude higher (10^9 A/cm²) than what is typically considered the upper limit where electro-migration becomes an issue. Electro-migration will not be an issue in the CGC layer 320 due to the extreme short time over which the field is applied at any location (roughly the bit period or a fraction of a nanosecond), however, it could be an issue for the tips of the pads 308A and 308B forming the capacitors which will repeatedly experience current densities of the same order.

By adding a second set of pads connected to another set of inductors oriented at ninety degrees to the first set of capacitors and driving a second LRC circuit with a ninety degree phase shifted signal, a circularly rotating magnetic field, rather than a linearly oscillating magnetic field, may be obtained. Such embodiments are shown in FIGS. 4A and 4B, which are bearing surface views of slider portions 400 and 450. In the interest of simplification, side shields 304A and 304B are not shown in FIG. 4A and FIG. 4B. As can be seen in FIGS. 4A and 4B, sliders or heads 400 and 450 include four conductive pads 308A, 308B, 308C and 308D, with pads 308A and 308B being located along a first axis 402 on the bearing surface and pads 308C and 308D being located along a second axis 404 perpendicular to the first axis 402 on the bearing surface. In the embodiment of FIG. 4A, distance 406, which is referred to as a gap place distance, to optimize field gradient for best switching. From FIGS. 4A and 4B, it is seen that positions of pads 308A, 308B, 308C and 308D may be different in different embodiments. It should be noted that, although portions of pads 308A, 308B, 308C or 308D may be in front of main pole 302 or trailing shield 306 at the bearing surface, the pads do not interfere with the operation of the main pole 302 and the trailing shield 306 because the pads 308A, 308B, 308C or 308D are non-magnetic.

Figure 5:
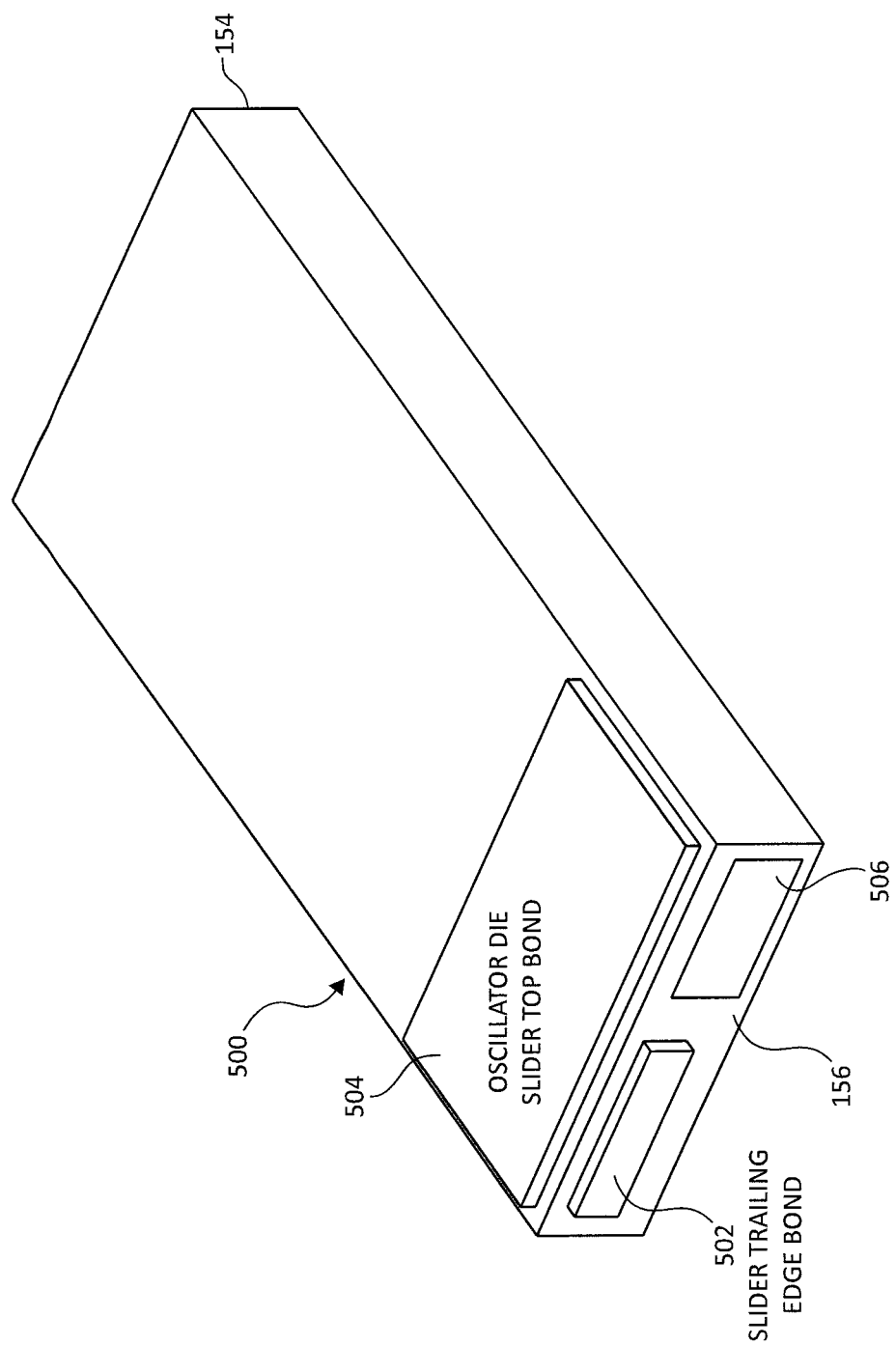
FIG. 5 is a perspective view of a general embodiment of a slider that includes a non-spin torque MAMR oscillator.

To use a circularly rotating field with MAMR recording, the direction of rotation is controlled with the bit pattern. This may be carried out by the addition of an electrically controllable inverter on one of the two branches (e.g., including an inverter in a first circuit of the type shown in FIG. 4D including pads 308A and 308B, or including the inverter in a second circuit of the type shown in FIG. 4B including pads 308C and 308D) driven with the bit pattern to produce a suitable change in chirality (clockwise (CW) or counter-clockwise (CCW) rotation). The microwave voltage source and any additional circuitry such as an inverter or phase shifter may be positioned on slider attached in a bonding process similar to the laser attach in HAMR heads due to the difficulty in transmitting microwaves without microstrip transmission lines unsuitable to the current flex circuit used to connect to the head. FIG. 5A is a diagrammatic illustration of a slider 500 showing possible locations 502, 504 and 506 for MAMR oscillator components (e.g., the voltage source and any additional circuitry such as inverter circuitry or phase shifting circuitry) that may be useful for the embodiments of FIGS. 4A and 4B. It should be noted that location 506 is within the slider 500 at trailing edge 156 and therefore semiconductor processes compatible with a thin film magnetic head fabrication process are employed in such an embodiment. Location 502 is on the trailing edge 156 of the slider 500 and location 504 is on top of the slider 500.

Figure 6:
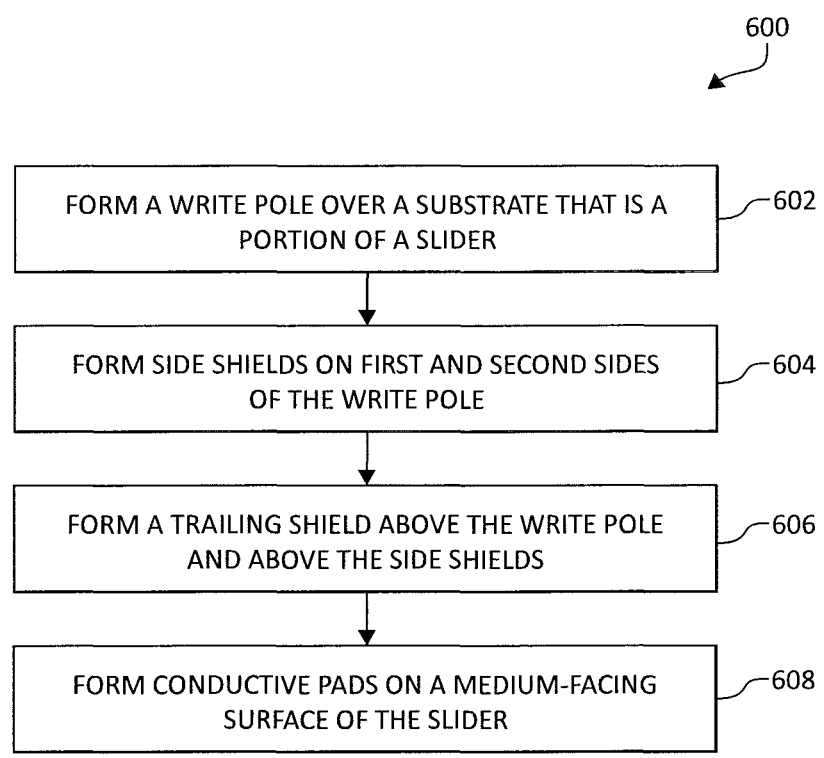
FIG. 6 is a flowchart of a method embodiment.

FIG. 6 is a flowchart of a method 600 in accordance with one embodiment. At 602, a write pole is formed over a substrate that is a portion of a slider. The write pole is capable of storing data on tracks on a data storage medium. At 604, side shields are formed on first and second sides of the write pole. A trailing shield is formed above the write pole and above the side shields at 606. At 608, conductive pads are formed on a medium-facing surface of the slider. The conductive pads are a part of a microwave assisted magnetic recording oscillator.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
    a slider comprising:
        a write pole configured to store data on tracks on a data storage medium;
        side shields on first and second sides of the write pole;
        a trailing shield above the write pole and above the side shields; and
    conductive pads attached to the slider and configured to form capacitors with portions of a conductive film of the data storage medium.

2. The data storage device of claim 1 and further comprising a microwave assisted magnetic recording oscillator that comprises the conductive pads that are configured to form the capacitors with the portions of the conductive film of the data storage medium, the conductive pads being positioned on a medium-facing surface of the slider.

3. The data storage device of claim 2 and wherein the conductive pads comprise two conductive pads disposed in a cross-track direction and positioned between the side shields and the trailing shield.

4. The data storage device of claim 2 and wherein the conductive pads comprise two conductive pads disposed in a down-track direction.

5. The data storage device of claim 2 and wherein the conductive pads comprise four conductive pads, with first and second ones of the four conductive pads being located along a first axis on the medium-facing surface and third and fourth ones of the four conductive pads being located along a second axis perpendicular to the first axis on the medium-facing surface.

6. The data storage device of claim 2 and wherein each of the conductive pads is protected by a dielectric layer.

7. The data storage device of claim 2 and further comprising at least one inductor electrically coupled to a resistance-capacitance network formed by the conductive pads and the data storage medium.

8. The data storage device of claim 2 and further comprising a microwave voltage source electrically coupled to the conductive pads.

9. An apparatus comprising:
   a write pole configured to store data on tracks on a data storage medium;
   side shields on first and second sides of the write pole;
   a trailing shield above the write pole and above the side shields; and
   a microwave assisted magnetic recording oscillator comprising conductive pads that are configured to form capacitors with portions of a conductive film of the data storage medium, the conductive pads being positioned on a medium-facing surface of a slider that includes the write pole, the side shields and the trailing shield.

10. The apparatus of claim 9 and wherein the conductive pads comprise two conductive pads disposed in a cross-track direction and positioned between the side shields and the trailing shield.

11. The apparatus of claim 9 and wherein the conductive pads comprise two conductive pads disposed in a down-track direction.

12. The apparatus of claim 9 and wherein the conductive pads comprise four conductive pads, with first and second ones of the four conductive pads being located along a first axis on the medium-facing surface and third and fourth ones of the four conductive pads being located along a second axis perpendicular to the first axis on the medium-facing surface.

13. The apparatus of claim 9 and wherein each of the conductive pads is protected by a dielectric layer.

14. The apparatus of claim 9 and further comprising at least one inductor electrically coupled to a resistance-capacitance network formed by the conductive pads and a data storage medium.

15. The apparatus of claim 9 and further comprising a microwave source electrically coupled to the conductive pads.

16. A method comprising:
   forming a write pole over a substrate that is a portion of a slider, the write pole being capable of storing data on tracks on a data storage medium;
   forming side shields on first and second sides of the write pole;
   forming a trailing shield above the write pole and above the side shields; and
   forming conductive pads on a medium-facing surface of the slider, the conductive pads are electrically isolated from each other and are formed as a part of a microwave assisted magnetic recording oscillator.

17. The method of claim 16 and wherein forming the conductive pads comprises forming two conductive pads disposed in a cross-track direction and positioned between the side shields and the trailing shield.

18. The method of claim 16 and wherein forming the conductive pads comprises forming two conductive pads disposed in a down-track direction.

19. The method of claim 16 and wherein forming the conductive pads comprises forming four conductive pads such that first and second ones of the four conductive pads are located along a first axis on the medium-facing surface and third and fourth ones of the four conductive pads are located along a second axis perpendicular to the first axis on the medium-facing surface.

20. The method of claim 16 and further comprising forming a protective dielectric layer over the conductive pads.

* * * * *